UNITED STATES PATENT OFFICE.

JEROME A. DRAPER, OF SHAFTSBURY, VERMONT.

IMPROVEMENT IN COMPOUNDS FOR PRESERVING WOOD.

Specification forming part of Letters Patent No. 152,620, dated June 30, 1874; application filed May 19, 1874.

*To all whom it may concern:*

Be it known that I, JEROME A. DRAPER, of Shaftsbury, in the county of Bennington and State of Vermont, have invented certain new and useful Improvements in Preservative Compound; and I do hereby declare that the following is a full, clear, and exact description thereof.

The nature of my invention consists in a compound for preserving shingles, or other articles made of wood that are exposed to the action of the atmosphere, rain, &c., as will be hereinafter more fully set forth.

My compound is composed simply of lime and rosin in about the following proportions, viz: Eight pounds of rosin, three buckets of lime. These ingredients are boiled together in sufficient water to slake the lime and mixed thoroughly.

The shingles are then boiled in this compound, when the lime will fill the pores of the wood, and the rosin will close the pores, so as to retain the lime in the wood.

The lime, being thus retained in the wood by the closing of the pores by the rosin, will prevent the wood from rotting by exposure to the atmosphere, rain, &c.

Other articles made of wood may be preserved in the same manner.

I do, however, not confine myself to the precise proportions of the ingredients herein mentioned, as they may perhaps be varied according to the kind of wood intended to be preserved, and the use the wood thus preserved is to be put to.

Having thus fully described my invention, what I claim as new, and desire to secure by Letters Patent, is—

The within-described compound for preserving wood, consisting of water, lime, and rosin, prepared and applied in the manner set forth.

In testimony that I claim the foregoing as my own I affix my signature in presence of two witnesses.

J. A. DRAPER.

Witnesses:
CHARLES HICKS,
H. K. MATHERS.